Aug. 17, 1948.  P. T. NIMS  2,447,133

FREQUENCY CONVERSION SYSTEM

Filed Nov. 30, 1944  4 Sheets-Sheet 1

FIG. 1.

INVENTOR.
Paul T. Nims.
BY
Harness and Harris
ATTORNEYS.

FIG. 3·B.

Patented Aug. 17, 1948

2,447,133

UNITED STATES PATENT OFFICE 2,447,133

FREQUENCY CONVERSION SYSTEM

Paul T. Nims, Detroit, Mich., assignor to Chrysler Corporation, Highland Park, Mich., a corporation of Delaware Application November 30, 1944, Serial No. 565,955

32 Claims. (Cl. 172—281)

The present invention relates to electrical control systems, and is particularly directed to the provision of improved apparatus which functions as a combination converter-inverter for deriving alternating current energy of a desired, adjustable frequency from a source of alternating current, the frequency whereof may be randomly variable over a range which is above, below, or which includes, the output frequency. In its herein illustrated embodiments, the invention is particularly designed for aircraft purposes, and serves to translate the variable frequency output of one or more engine driven generators into an alternating current output of adjustably fixed frequency.

Principal objects of the present invention are to provide a system of the aforesaid type, which is simple in arrangement, requires a minimum number of structural elements, is relatively light in weight, and is reliable and efficient in operation; to provide such a system which may be characterized in that the alternating current output of a generating unit is delivered to an alternating current output circuit, through rectifying means which are connected to act as a combination converter-inverter; to provide such a system wherein the alternating current outputs of a plurality of units may be readily paralleled and embodying improved means for controlling the division of load between the several units; and to generally improve and simplify the construction and arrangement of systems of the above generally indicated type.

With the above, as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

It will be appreciated from a complete understanding of the present invention, that in a generic sense, the improvements thereof may be embodied in widely differing electrical control systems intended for widely differing specific applications. As is mentioned above, a representative and now preferred application of the invention is in providing electric power for aircraft. It will be understood that present day aircraft require amounts of electric power which cannot conveniently be supplied from the conventional direct current battery systems. As an example, many present day aircraft require an electric supply system having a capacity up to or in excess of 40 k. v.-a. These requirements have led to various efforts to provide the aircraft with a self-contained generating system and the improvements of the present invention are admirably suited for, but not limited to, the solution of this problem.

Generically, and in accordance with the present invention, the aircraft is provided with one or more multi-phase alternating current main generators, each individual to and arranged to be continuously driven by a corresponding main engine of the aircraft. Means are preferably provided to maintain the voltage amplitude of each main generator at a substantially constant value throughout the expected range of operating speeds of the associated driving engine. This range of engine speeds may correspond to, for example, a range of generator speeds from 4,000 R. P. M. to 10,000 R. P. M. The generator output, of substantially fixed amplitude but widely variable frequency, is delivered to control valves having combination converter-inverter characteristics, thereby resulting in the delivery to the output circuit of alternating current of adjustably fixed frequency and adjustably constant amplitude.

Figure 1:
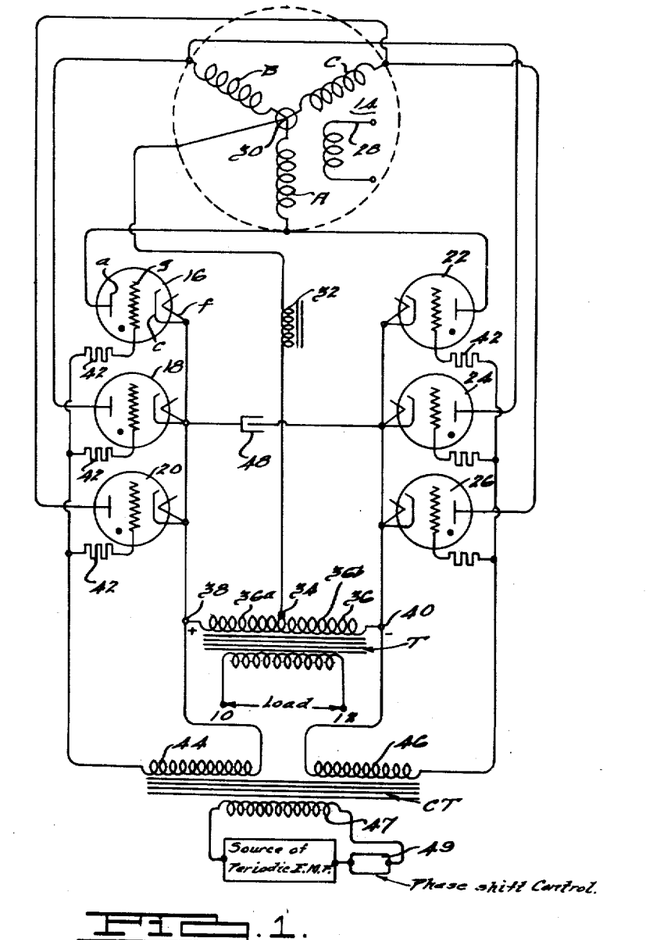
Figure 1 is a diagrammatic view of an embodiment of the invention.

In the system of Figure 1, the terminals 10 and 12 of an illustrative single phase output circuit, are supplied with alternating current of an adjustably fixed frequency, from a main alternating current generator 14, through a combination converter-inverter comprising electric valves 16, 18, 20, 22, 24, and 26.

Generator 14 may be of any suitable construction, a polyphase machine being preferred. More particularly, it is preferred to provide generator 14 with three or more phases, three being shown and being designated respectively as A, B, and C. Generator 14 may be driven in any desired manner by a suitable prime mover (not shown) which, in the case of an aircraft power supply system, may be an associated main driving engine of the aircraft. It will be understood accordingly that the operating speed of generator 14 may be expected to be randomly variable over a relatively wide range. In an illustrative case, generator 14 may be geared to the associated engine and may have an operating speed range which causes the frequency of generator 14 to vary between 200 and 500 cycles per second.

Generator 14 is illustrated as having a usual field winding 28, and regulating apparatus (not shown) is preferably associated therewith and serves to maintain the voltage amplitude of generator 14 at a substantially uniform value throughout the expected operating speed range, in, for example, the manner described in connection with Figs. 3A–3B.

With the present system the output frequency is virtually independent of the input frequency and consequently may fall below, within, or above the range of the input frequency. As an example, an output frequency of 400 cycles per second is suitable for aircraft purposes.

Electric valves 16, 18, 20, 22, 24, and 26, may be of any of a variety of different types. Preferably and as illustrated, these valves are conventional three-element gas-filled tubes of the discontinuous control type. That is to say, these valves, though normally nonconductive, may be rendered conductive when their anodes *a* are sufficiently positive with respect to their cathodes *c*, by rendering the grids *g* thereof either neutral or positive with respect to such cathodes. When so rendered conductive, the grids lose control and the valves remain conductive so long as the anodes are sufficiently positive with respect to the cathodes to sustain a discharge. The valves are illustrated as being of the indirectly heated cathode type, and are provided with filaments *f*, which may be supplied with heating current from any suitable source (not shown).

As shown, the anodes of valves 16 and 22 are connected to one terminal of phase A, the anodes of valves 18 and 24 are connected to a terminal of phase B, and the anodes of the remaining valves 20—26 are connected to a terminal of phase C. The remaining terminals of phases A, B, and C are connected together at 30, and are connected through a reactor 32 to the center tap 34 of the primary winding 36 of an output transformer T. The terminals 38 and 40 of winding 36, are connected respectively to the cathodes of valves 16, 18, and 20 and to the cathodes of valves 22, 24, and 26.

In operation, valves 16, 18, and 20 thus serve to conduct current from phases A, B, and C, in one direction, through the left-hand half 36*a* of winding 36. Valves 22, 24, and 26 in turn serve to conduct current from phases A, B, and C, in the opposite direction through the right-hand half 36*b* of winding 36.

It will be understood that although valves 16, 18, and 20 are illustrated as being structurally separate, they may, in view of the common cathode connections thereof, be combined into a single multiple anode valve. Similar comments apply to valves 22, 24, and 26.

In accordance with the present invention, valves 16—18—20 and 22—24—26 are alternately rendered conductive and non-conductive, each conductive and each non-conductive interval having a duration equal to one-half cycle of the output circuit. The successive points, with respect to time, at which one valve group is rendered conductive and the other valve group is extinguished, are referred to hereinafter as the commutation points of the system.

In the present system the electrical constants of the converter-inverter circuit are such that the voltage wave between the output terminals 10—12 lags somewhat behind the time schedule represented by the successive commutation points. Thus the output voltage remains positive, or negative, as the case may be, for a fraction of a half cycle after the corresponding valve group has been extinguished. At each commutation point, however, an action takes place which leads to a reversal of the output voltage.

For descriptive purposes accordingly, valves 16—18—20 may be regarded as being associated with positive half-cycles of the output or load circuit and valves 22—24—26 may be regarded as being associated with negative half cycles thereof.

In the broader aspects of the invention any of a variety of control arrangements may be utilized to render the main valves conductive in the aforesaid relation.

In accordance with the illustrated embodiment of the invention, the grids of valves 16, 18, and 20 are interconnected, through current limiting resistors such as 42, and are connected to one terminal of the secondary winding 44 of a control transformer CT, the other terminal of such secondary winding being connected to the cathodes of these valves. The grids of valves 22, 24, and 26 are similarly connected to the cathodes thereof through an additional secondary winding 46 on the control transformer CT. The primary winding 47 of transformer CT is arranged for connection to any suitable source of periodic current (not shown) which is adapted to induce voltages of alternately opposite square wave form in windings 44 and 46, the frequency of such induced voltages being equal to the desired output frequency of the system. Illustrative sources of such periodic voltages are shown in the embodiment of Figures 3A–3B.

Figure 2:
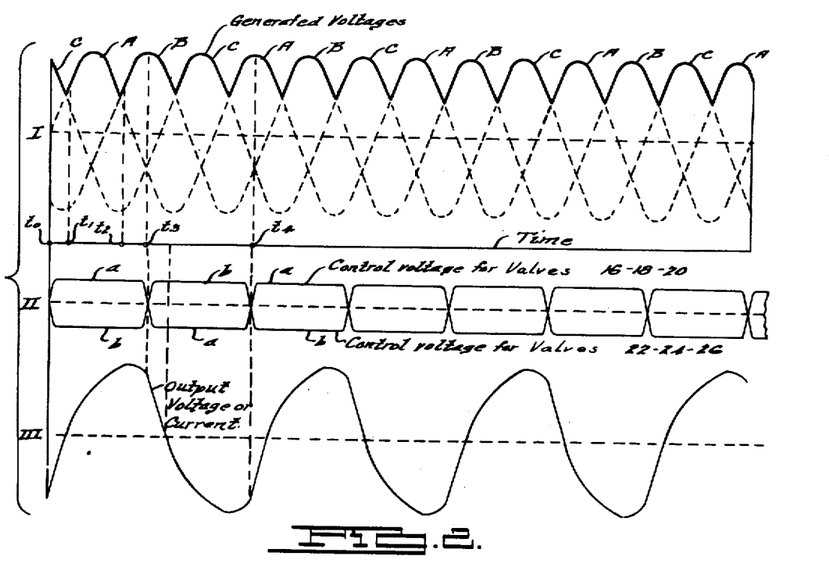
Fig. 2 comprises a series of curves which illustrate the operation of the system of Fig. 1.

It is believed that the remaining features of the system may best be understood from a description of the operation thereof, with reference to Figures 1 and 2. Assuming that generator 14 is in operation, it will be appreciated that the voltages generated in phases A, B, and C thereof assume substantially the form indicated by the full lines and dotted lines in portion I of Figure 2. Similarly, the grid potential applied to valves 16—18—20 are indicated by curve *a* in portion II of Figure 2. The grid potential applied to valves 22—24—26, in turn takes the form indicated by curve *b* in corresponding portion of Figure 2, these current potentials being 180 degrees out of phase with each other, and in the assumed case of Figure 2, having a frequency approximately 15% below the frequency of generator 14. At the time $t_0$ in Figure 1, the grids of valves 16, 18, and 20 are simultaneously rendered positive with respect to the cathodes thereof and the grids of the remaining valves are rendered correspondingly negative with respect to their cathodes. This action tends to render all three of valves 16, 18, and 20 conductive. At the time $t_0$, however, phase C is more strongly positive than are phases A and B. Since the cathodes of these valves are at the same potential, this circumstance renders the anodes of valves 16 and 18 negative with respect to their cathodes, so that these valves are nonconductive. Valve 20 is, however, rendered conductive and passes current until approximately the time $t_1$ which occurs just after the voltage of phase A becomes sufficiently more positive than the voltage of phase C to render the anode of valve 16 sufficiently positive with respect to its cathode to initiate a discharge therethrough. At the time the discharge through valve 16 is initiated, the potential of the cathode of valve 20 rises to a value above the potential of its anode and the discharge through valve 20 is extinguished. Similarly, at approximately $t_2$, the discharge transfers from valve 16 to valve 18. The generated voltages in phases A, B, and C of generator 14 during the just-mentioned conductive intervals of valves 16—18—20 are indicated in full lines in portion I of Figure 2.

The discharges through valves 20—16—18 pass through the left-hand half 36a of transformer winding 36, and through the reactor 32. A portion of such current also serves to charge up a commutating condenser 48, bringing the left-hand terminal thereof to a positive value with respect to the right-hand terminal.

It will be understood that the charge on the commutating condenser 48, which is preferably fully developed in a time interval just slightly less than a half-cycle of the output frequency, is equal to twice the value of the voltage appearing across winding portion 36a, and renders the cathodes of valves 22—24—26 rather strongly negative with respect to their anodes. During the half cycle in question, however, the grids of the last-mentioned valves 22—24—26 are maintained negative with respect to such cathodes by the negative voltage induced in winding 46 of the control transformer CT.

At the time $t_3$, in Figure 2, the grids of valves 22—24—26 are rendered strongly positive with respect to their cathodes and the grids of the remaining valves 16—18—20 are rendered correspondingly negative with respect to their cathodes. The latter tends to, and may, in certain cases, be effective to extinguish the discharge in that one of valves 16—18—20 which is conducting current at the time $t_3$. Even if not, such discharge is extinguished by the action of commutating condenser 48, as described below.

The positive biasing of the grids of valves 22—24—26 tends to render all of these valves conductive. At the time $t_3$, phase B is most strongly positive, and consequently valve 24 is the only one of the three which is rendered conductive. As soon as valve 24 becomes conductive, its cathode potential (and consequently the potential of the negative terminal of condenser 48) rises to a value which is below the potential of phase B by only the comparatively small voltage drop through valve 24. Commutating condenser 48 thus becomes effective to swing the cathodes of valves 16—18—20 strongly positive with respect to their anodes, which action effectively extinguishes any discharges then existing therein. The just-mentioned action of commutating condenser 48 also elevates the potential of terminal 34 to a value well above normal. The consequent increase in potential between terminals 34 and 30 is, of course, absorbed by reactor 32.

At the time valve 24 becomes conductive, as aforesaid, it tends to initiate a flow of current in the right-hand portion 36b of primary winding 36, in a direction corresponding to a negative half cycle of voltage between the output terminals 10 and 12. At this time, however, condenser 48 maintains terminal 34 positive with respect to terminal 40. The actual reversal of the induced voltage in the output winding of transformer T is consequently delayed for an interval determined by the relative magnitudes of the impedances in the converter-inverter network. This relation is indicated in the curve shown in portion III of Figure 2 which, assuming a unity power factor load connected to terminals 10—12, may be considered as representing either current or voltage in the output or load circuit. As shown on this curve, the output voltage or current wave passes through zero at a time which is displaced with respect to the control voltage wave (portion II) by a fraction of a half cycle. The magnitude of this fraction, as well as the general shape of the output voltage or current wave, are of course determined, as mentioned above, by the relative magnitudes of the impedances in the converter-inverter network.

Accordingly, although the transfer from one valve group to another valve group, at each aforesaid commutation point, does not necessarily result in a simultaneous reversal of the output voltage or current, such transfer does initiate or result in such a reversal.

In the interval from the time $t_3$ until the time $t_4$, valves 24, 26 and 22 successively pass current in the manner described above with respect to valves 20—16—18. These actions terminate the positive half cycle of the output circuit and produce that portion of the negative half cycle which is to the left of the time line $t_4$.

At the time $t_3$, as aforesaid, the charge initially stored in commutating condenser 48 discharges through the local circuit including condenser 48 and winding 36 and a reverse charge is built across condenser 48 which brings its right-hand terminal positive and its left-hand terminal negative. The latter action swings the potential of the cathodes of valves 16—18—20 to a negative value with respect to their anode potentials. The constants of the just-mentioned discharge circuit are preferably adjusted so that this action does not take place until after one of valves 16—18—20 which was last to conduct has had time to fully de-ionize. Consequently, the negative bias applied to the grids of valves 16—18—20 during the negative half cycle of the output voltage, now in progress, has time to take effect, and these valves remain non-conductive during such negative half cycle.

It is believed to be evident that at the time $t_4$, the positive half cycle of the output voltage is initiated, and the negative half cycle is terminated in a manner analogous to that described above in connection with the initiation of the negative half cycle.

So long, therefore, as generator 14 remains in operation, and windings 44 and 46 are supplied with periodic control potentials, the output circuit 10—12 is supplied with an alternating voltage of a frequency which is substantially independent of the frequency of generator 14 and is equal to the frequency of the periodic potential applied to the control transformer CT. The amplitude of the output voltage in turn is controlled as aforesaid by the excitation of the generator field winding 28. The form of the output voltage wave, and its phase position with respect to the control voltages (portion II, Fig. 2) in turn, may be controlled within reasonable limits by suitably adjusting the constants of the converter-inverter circuit.

Figure 3A:
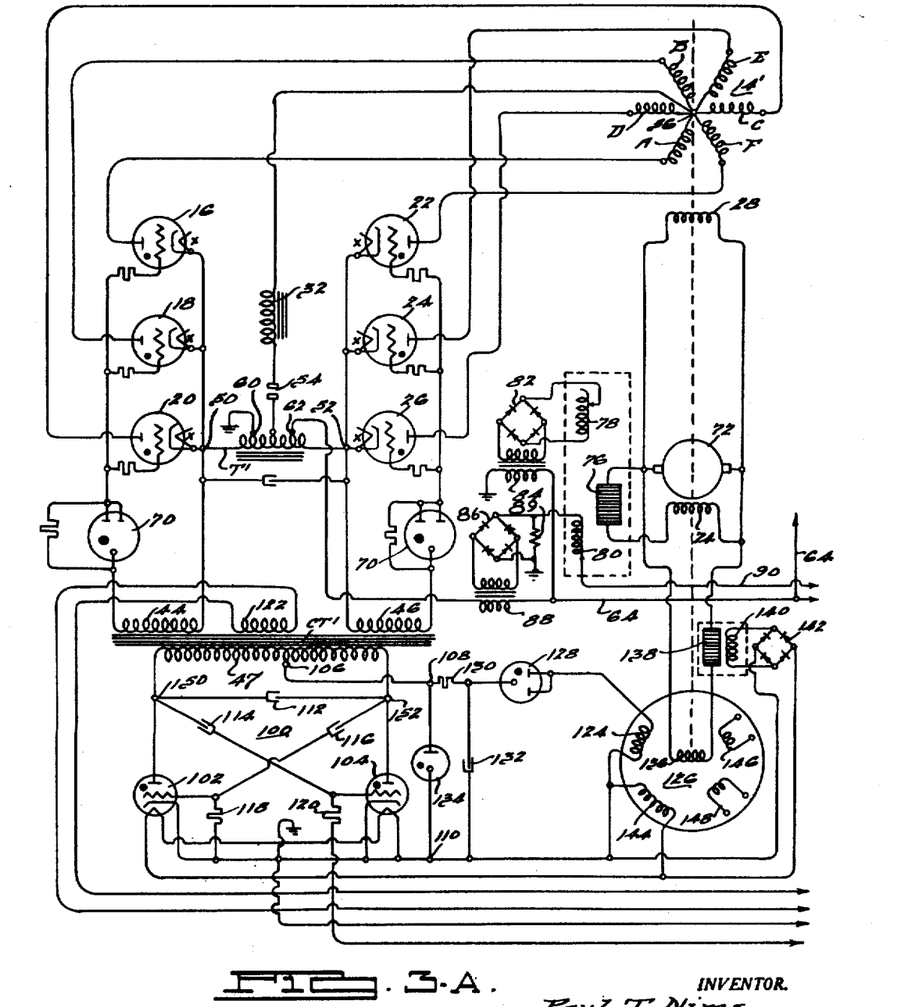
Figures 3A and 3B together comprise a diagrammatic illustration of another embodiment of the invention, Figure 3B being adapted to be placed to the right of Figure 3A.
Figure 3B:
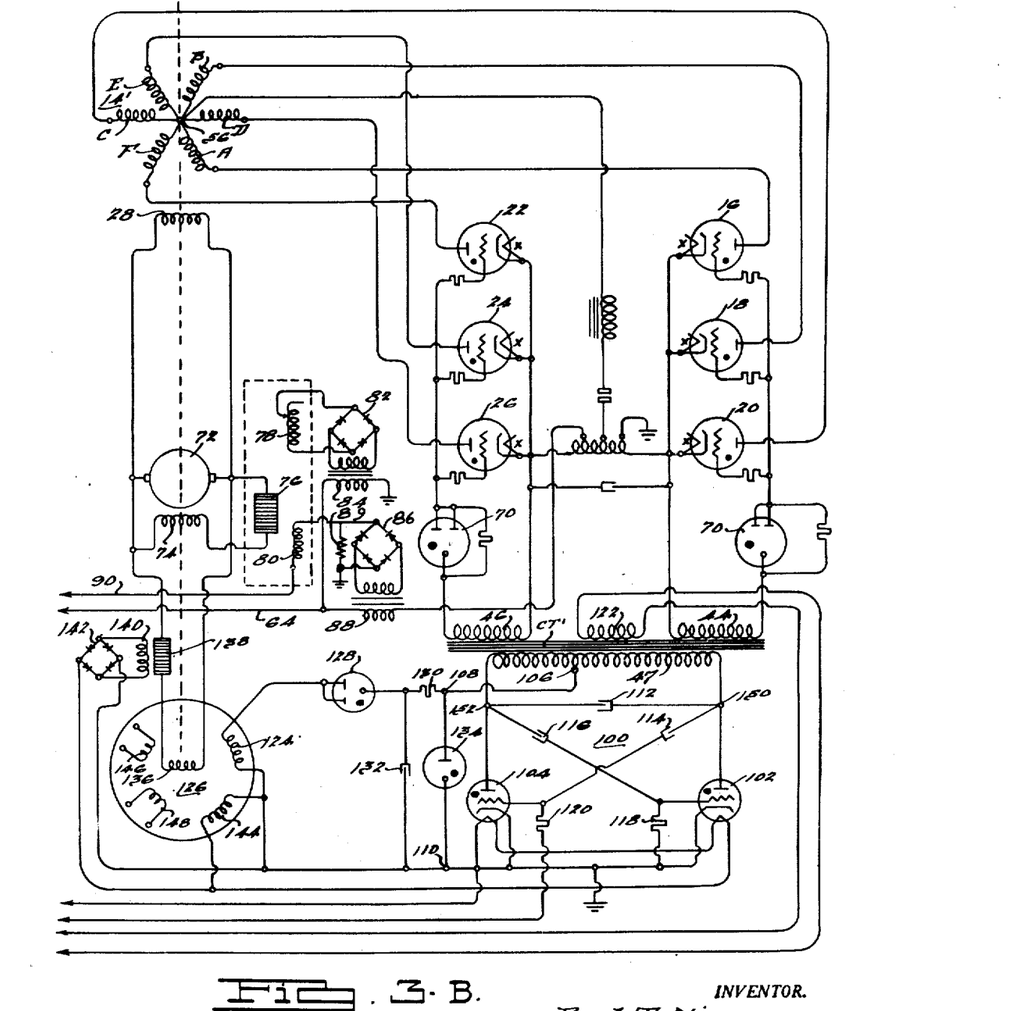

Referring now to the modification shown in Figures 3A and 3B, the main generator 14' is illustrated as having six phase windings A, B, C, D, E, and F, which, as will be understood, generate voltages which are displaced 60 electrical degrees apart. Phases A, B, and C are connected in the previously described manner, to the anodes of valves 16, 18, and 20. The phases D, E, and F in turn are connected to the anodes of valves 22, 24, and 26. The cathodes of the respective groups of valves are interconnected as before to the respective terminals 50 and 52 of the output auto transformer T', the center tap whereof is connected through a control switch 54, and a reactor 32, to the center terminal 56 of generator 14'. Output circuit terminals are designated respectively 60 and 62, terminal 60 being connected to ground and terminals 62 being connected to the bus bar 64 which is common to the two units shown respectively in Figure 3A and Figure 3B.

The grid connections for the respective groups of valves duplicate the connections previously described with the exception that in this case auxiliary valves 70 are interposed in these grid circuits and serve, as will be understood, to prevent the grids of the associated main valves from functioning as anodes. Such auxiliary valves 70 may, of course, be utilized in the system of Figure 1.

In the embodiment now being described, excitation for the field winding 28 of generator 14' is supplied by a usual direct current exciter generator 72 which may be and preferably is mounted on the same shaft with and directly driven with generator 14'. Exciter 72 is illustrated as having a usual shunt field winding 74, connected across the armature terminals thereof in series with a regulator 76 which is illustrated as being of the conventional carbon-pile type. Regulator 76 is diagrammatically shown as having a pair of cooperating differentially arranged control windings 78 and 80. Winding 78 is connected, through a conventional full wave rectifier 82 to the output terminals of a potential transformer 84. Winding 78 is thus energized in accordance with the amplitude of the voltage appearing between the bus bar 64 and ground. The current winding 80 is connected between rectifier 86 and a similar terminal on the winding 80 of the other voltage regulator associated with the other generator. Rectifier 86 is connected to the output terminals of a conventional current transformer 88 and has a resistor 89 connected as a load, such that the voltage across resistor 89 is proportional to the load current drawn from the corresponding power transformer T'. Thus the current flowing through the two windings 80 in series is proportional to the difference in load between the two transformers T' and this current flows from the heavily loaded unit to the lightly loaded unit. As will be evident the system of Fig. 3B is identically arranged, and it will be understood therefore that so long as the control transformers CT' of the two units are energized in synchronism with each other, both units will deliver power at the same frequency. By virtue of the voltage regulators, further, both units will be caused to operate at substantially the same voltage. If one unit tends to take less than its share of bus bar load the current windings 80 will be energized in the appropriate direction. These actions act upon the regulating elements 76 in such relation as to cause the voltage of the lightly loaded unit to increase and to cause the voltage of the more heavily loaded unit to decrease, thereby re-establishing a proper division of the load.

Preferably and as indicated, the current windings 80 of the two units are grounded, and are interconnected by an equalizing connection 90.

The converter-inverter action of each of the units of Figures 3A and 3B is the same as described with reference to Figure 1 with the exception that in the embodiment now being described, phases A, B, and C serve to deliver current through valves 16—18—20 and the remaining phases serve to deliver current through the remaining valves. The termination of half cycles of one polarity and the initiation of half cycles of opposite polarity take place in identically the same manner as in Figure 1. Similarly, during each half cycle, the transfer of the current flow from one valve to another valve of the same series takes place in the same manner as described above. Portions of cycles during which the indicated generator phases deliver current to the output circuit are shown in full lines in portion I of Fig. 4, portions II and III whereof correspond to Fig. 2.

Illustrative sources of excitation for the control transformers CT' of Figures 3A and 3B are shown as comprising conventional inverter circuits 100. Each inverter circuit 100 employs a pair of current controlled rectifiers 102 and 104 which may be of conventional type, and are preferably of the gas-filled, discontinuous control type. The anodes of these valves are connected to the terminals of the primary winding 47 of the corresponding control transformer CT', the center tap 106 whereof is connected to the positive terminal 108 of a source of direct current of substantially fixed value. The cathodes of valves 102 and 104 are connected to the negative terminal 110 of the just-mentioned direct current source. A commutating condenser 112 is connected across each winding 47, and additional commutating condensers 114 and 116 are connected between the respective grids and the indicated terminals of each winding 47. The grid of each valve 102 is directly connected through a resistor 118 to the negative supply terminal 110. The grid of each valve 104 is connected to terminal 110 through a resistor 120 and an additional secondary winding 122 associated with the control transformer CT' for the companion unit.

Direct current is supplied to terminals 108 and 110 for each unit, through a conventional rectifier and regulator circuit, from the output winding 124 of an alternating current pilot generator 126 which may be and preferably is carried on and driven by the same shaft that drives the corresponding main generator 14' and exciter 72. The circuit of winding 124 includes a conventional rectifier 128, resistor 130, condenser 132, and regulating valve 134. The field winding 136 of each pilot generator 126 is connected directly across the armature of the exciter 72, in series with a usual regulator 138. The control winding 140 associated with each regulator 138 is connected, through conventional full wave rectifier 142, across an additional output winding 144 of each generator 126. It will be understood accordingly that each regulator 138 serves to maintain the voltage output of the associated windings 124 and 144 as well as of the other associated pilot output windings 146 and 148 at a substantially constant value. It will further be understood that the regulating valve 134 serves to maintain a substantially constant potential difference between terminals 108 and 110, which difference is somewhat below the output voltage of winding 124. Independently, accordingly, of any fluctuations in the voltage output of each generator 126, the associated inverter circuit 100 is supplied with direct current at a substantially fixed voltage.

It is noted that each winding 144 serves as a source of supply of heating current for the filaments $f$ of the associated valves 102 and 104. Windings 146 and 148 in turn may serve as sources of power for the filaments for the associated main valves 16—18—20 and 22—24—26.

Figure 4:
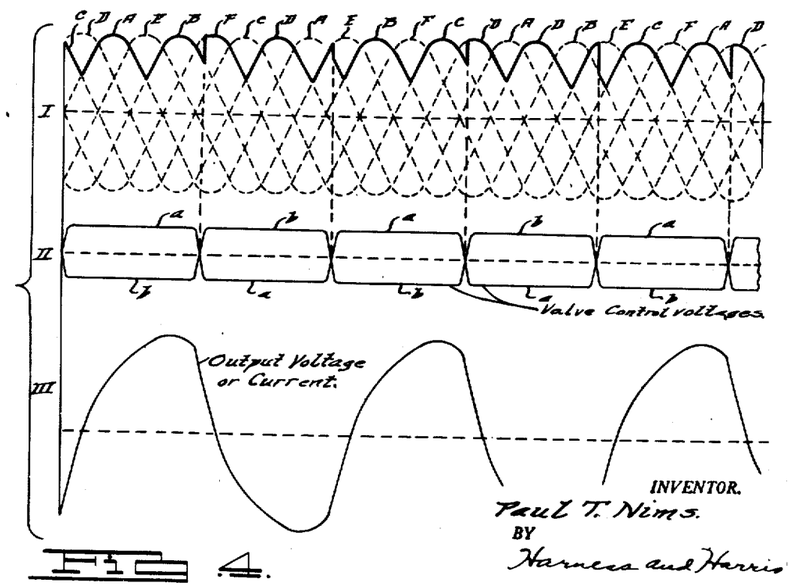
Fig. 4 comprises a series of curves illustrative of the operation of the system of Figures 3A-3B.

The operation of each inverter circuit 100, in producing alternately opposite voltages of substantially square wave form in the corresponding control windings 44 and 46, which voltages are depicted by curves $a$ and $b$ in portion II of Figure 4, is as follows:

Assuming for example, that valve 102 is fully conductive, it will be appreciated that it is effective to pass current from the source 108—110 through the left-hand half of the associated winding 47. Such current flow induces voltages of proper polarity in the windings 44 and 46. Such current flow through winding 47 is accompanied by the building up of a charge in the associated commutating condenser 112, which renders its terminal 150 negative, and renders its terminal 152 positive. The potential difference so built up is equal to approximately twice the potential difference between terminals 150 and 106, as will be understood. During the period also that valve 102 is conducting, current is enabled to flow from terminal 108 through the right-hand half of winding 47 and charge up condenser 116, such charging circuit being completed by the connection of condenser 116 to terminal 110, through resistor 118. This charging action when complete, leaves the grid of valve 102 neutral with respect to its cathode, and so does not interfere with the full conductivity thereof. It does, however, bring the positive terminal of condenser 116 to a potential which is equal to twice the potential of terminal 108 with respect to ground.

During the flow of current through valve 102, valve 104 is blocked off by a previously existing charge (acquired as described below) on condenser 114. During the flow of current through valve 102, this charge is enabled to dissipate itself through a local circuit which includes condenser 114, resistor 120, the previously mentioned synchronizing winding 122, and valve 102. When the grid of valve 104 becomes neutral, or sufficiently positive, with respect to the cathode of valve 104 to permit conduction therethrough, the relatively high voltage then existing between terminals 152 and 110 is enabled to initiate a flow of current through valve 104. As soon as valve 104 becomes conductive, the potential of terminal 152 falls to a value which exceeds the potential of terminal 110 only by the amount of the relative small voltage drop through valve 104. In view of the charges then existing on condensers 106 and 116, respectively, this action swings the anode of valve 102 rather strongly negative with respect to its cathode and also swings the grid of valve 102 to a strongly negative value with respect to its cathode. Current flow through valve 102 is therefore abruptly terminated at the instant that valve 104 becomes conductive.

When valve 104 becomes conductive also the potentials of terminals 150 and 152 reverse themselves, since current flow through winding 47 is reversed. This enables the energy stored in condenser 112 to discharge through winding 47 and further enables a reverse charge to be built up therein, which brings terminal 150 to a potential, with respect to ground, which is approximately twice the potential of terminal 108. Also during current flow through valve 104, condenser 114 builds up a charge in the manner previously described with respect to condenser 116, and the previously described charge on condenser 116 is dissipated through the local circuit including resistor 118 and the now conductive valve 104. When this charge on condenser 116 has leaked off sufficiently to render valve 102 conductive, current flow through valve 104 is terminated in the manner described above with respect to the termination of current flow through valve 102. So long, therefore, as power is applied to terminals 108 and 110, valves 102 and 104 are alternately conductive, each conductive period of valve 102 for example serving to establish a positive half cycle for winding 44 and a negative half cycle for winding 46. Each conductive interval for valve 104 on the other hand establishes a negative half cycle for winding 44 and a positive half cycle for winding 46.

It will be understood that in order to impart the square wave form to the voltages of windings 44 and 46, the output currents of the inverter valves 102 and 104 are of saw-tooth wave form. That is to say the constants of the output circuits of these valves are such that when for example valve 102 is rendered conductive, the consequent current flow through the left-hand portion of winding 47 rises along a substantially linear curve to a maximum which is attained at substantially the same time that this valve is abruptly rendered non-conductive. This gradually rising current through the left-hand portion of winding 47 establishes, when initiated, the maximum desired voltage output in each of windings 44 and 46 and thereafter, because of the uniform rate of increase in the current through winding 47, maintains the voltage outputs of windings 44 and 46 at a substantially constant value. When valve 102 is abruptly rendered non-conductive, this voltage immediately drops to zero, terminating the half cycle of control voltage then in progress. Similar comments apply to the gradual rise and abrupt decrease of current flow through valve 104.

With respect to the synchronizing feature for the several inverter circuits 100, associated with the respective units of Figures 3A and 3B, it will be noticed that each auxiliary winding 122 is connected in such a way that while the respective valves 102 are conductive, windings 122 apply slight negative biases to the grids of the corresponding valves 104. When neither valve 104 becomes conductive, by virtue of the dissipation of the charge on its corresponding condenser 114, as described aforesaid, the voltage of the corresponding winding 122 is immediately reversed and such winding is effective to apply a pulse to the other valve 104 which renders it conductive. Windings 122 thus serve to maintain the two inverter circuits in synchronism with each other.

It will be appreciated that in normal operation, with respect to both of the above described embodiments, the input and output frequencies may be expected to differ from each other, it being clear from the description that the percentage difference is largely immaterial. Further, it is immaterial which of the frequencies is the higher. In connection with aircraft purposes, for example, there may be conditions under which the input and output frequencies are identical. The system functions entirely satisfactorily under these conditions, the only difference in its operating conditions being that the loading of the individual main valves is not uniform. For certain phase relations also certain of the main valves may be inactive if the input and output frequencies are identical. It is, of course, within the purview of the present invention to utilize valves of sufficiently large rating to accommodate such irregular loadings.

Although only two embodiments of the present invention have been described in detail, it will be appreciated that various modifications in the form, number, and arrangement of the parts may be made without departing from the spirit and scope of the invention.

What is claimed is:

1. In a system for delivering alternating current of one frequency to an output circuit from an input circuit of another frequency, the combination of at least a pair of electric valve means coupled between said circuits so that current from said respective means tends to cause current to flow through the output circuit in respectively opposite directions, means for alternately rendering the said means conductive and non-conductive at said output frequency, one said means being conductive during intervals that the other said means is non-conductive, and means operable upon initial current flow through one of said valve means instantly to terminate current flow through the other of said valve means.

2. In a system for transferring power from a multi-phase alternating current source to an alternating current output circuit, said phases being of such number and of such relative phase displacement that at any given time at least one thereof is of a given polarity, at least a pair of electric valve means, each of said valve means being connected to at least two phases of said source in such relation that, when conductive, they are effective to pass current impulses of said given polarity, means coupling the valve means to the output circuit so that current passed through the respective valve means tends to cause current pulsations of respectively opposite polarity in the output circuit, and means for alternately rendering the complete valve means conductive and non-conductive, one said valve means being conductive while the other is non-conductive, the conductive one of the alternately rendering means being operable to place said valve means in condition to pass current from any of the phases to which it may be connected.

3. In a system for transferring alternating current energy between associated input and output circuits, a multiphase source of such energy constituting said input circuit, at least a pair of electric valve means, each of said pair including cathode means and grid means and not less than two anodes, each of said anodes being connected to a corresponding phase of the source in such relation that said valve means are effective to pass current of like polarity, means coupling the valve means to the output circuit so that current passing the respective pair of valve means tends to cause current pulsations of respectively opposite polarity in the output circuit, and means for alternately completely rendering each of said valve means conductive and non-conductive, one said valve means being conductive while the other is non-conductive.

4. In a system for transferring alternating current energy between associated input and output circuits, a source of such energy of at least three phases constituting said input circuit, electric valve means defining at least three discharge paths, each having an anode and a cathode, connected to the respective phases so as to pass current of like polarity, means coupling the valve means to the output circuit so that current passing through the respective paths tends to cause current flow of one polarity in the output circuit, and means for sequentially and simultaneously rendering the complete valve means conductive and non-conductive so as to define a succession of spaced current impulses in said output circuit.

5. In a system for transferring alternating current energy between associated input and output circuits, a source of such energy of at least three phases constituting said input circuit, electric valve means defining at least three discharge paths, each having an anode and a cathode, connected to the respective phases so as to pass current of like polarity, means coupling the valve means to the output circuit so that current passing through the respective paths tends to cause current flow of one polarity in the output circuit, and means for sequentially and simultaneously rendering the complete valve means conductive and non-conductive so as to define a succession of spaced current impulses in said output circuit, and additional valve means connected between the source and the output circuit for transmitting current impulses of opposite polarity in the intervals between said first-mentioned impulses.

6. In a system for transferring alternating current energy between associated input and output circuits, a source constituting said input circuit and having a plurality of phases, electric valve means defining a plurality of discharge paths the anodes whereof are connected to corresponding terminals of corresponding ones of said phases, additional electric valve means defining a plurality of discharge paths the anodes whereof are connected to corresponding ones of said phases, translating means connected between another terminal of each phase and the cathodes of the corresponding valve means, current flow in each valve means tending to cause current flow in a corresponding direction in the corresponding translating means, means for alternately rendering the valve means conductive, and means coupling the output circuit to the translating means so that successive current impulses passed by the respective valve means cause current flow in respectively opposite directions in the output circuit.

7. In a system for transferring alternating current energy between associated input and output circuits, a source constituting said input circuit and having a plurality of phases, electric valve means defining a plurality of discharge paths the anodes whereof are connected to corresponding terminals of corresponding ones of said phases, additional electric valve means defining a plurality of discharge paths the anodes whereof are connected to corresponding ones of said phases, a translating means comprising a winding having its respective terminals connected to the cathodes of the respective valve means and having an intermediate terminal connected to another terminal of each of said phases, control means for successively rendering said valve means conductive in alternate relation, and means coupling the output circuit to the translating means so that successive current impulses passed by the respective valve means cause current flow in respectively opposite directions in the output circuit.

8. The system of claim 7 wherein each phase of said source is common to corresponding said paths of said first and second-mentioned valve means.

9. The system of claim 7 wherein each phase of said source is individual to a corresponding path of a corresponding one of said valve means.

10. The system of claim 7 wherein said control means includes energy storage means coupled between said cathodes.

11. In a system for transferring alternating current energy between associated input and output circuits, a source constituting said input circuit and having a plurality of phases, electric valve means defining a plurality of discharge paths the anodes whereof are connected to corresponding terminals of corresponding ones of said phases, additional electric valve means defining a plurality of discharge paths the anodes whereof are connected to corresponding ones of said phases, a translating means comprising a winding having its respective terminals connected to the cathodes of the respective valve means and having an intermediate terminal connected to another terminal of each of said phases, control means for successively rendering said valve means conductive in alternate relation, and means coupling the output circuit to the translating means so that successive current impulses passed by the valve rectifying means cause current flow in respectively opposite directions in the output circuit, said control means including a source of periodic alternating voltages of opposed phase relation each corresponding to a corresponding one of said valve means.

12. Apparatus for supplying alternating current energy to a load circuit comprising a plurality of systems as defined in claim 7, and means connecting the output circuits of each thereof in parallel with each other to said load circuit.

13. Apparatus for supplying alternating current energy to a load circuit comprising a plurality of systems as defined in claim 11, means connecting the output circuits of each thereof in parallel with each other to said load circuit.

14. Apparatus for supplying alternating current energy to a load circuit comprising a plurality of systems as defined in claim 11, means connecting the output circuits of each thereof in parallel with each other to said load circuit, and means for synchronizing the said periodic voltages of the respective said systems.

15. Apparatus for supplying alternating current energy to a load circuit comprising a plurality of systems as defined in claim 7, means connecting the output circuits of each thereof in parallel with each other to said load circuit, and voltage regulating means for said respective systems to control the division of load between them.

16. In a system for transferring power from a polyphase alternating current input circuit to an output circuit electrically coupled thereto, the coupling comprising electric valve means defining a plurality of discharge paths, each of said paths including an anode connected to different phases of said input circuit, cathode means in said paths co-operable with said anodes, means simultaneously rendering said paths in condition to transmit current from any of said anodes to said cathode means so that the paths having the one of said anodes at the greatest potential relative to said cathode means will conduct current from said input circuit to said output circuit.

17. The invention as described in claim 16 in which the means rendering the paths in condition to transmit current is controlled in accordance with the frequency desired in the output circuit.

18. Apparatus for supplying alternating current energy to a single load circuit comprising a plurality of couplings as defined in claim 16, means connecting the output circuit of each thereof in parallel with each other to said load circuit, and voltage regulating means for said respective systems to control the division of load between them.

19. Apparatus for supplying alternating current energy to a load circuit comprising a plurality of couplings as defined in claim 16, means connecting the output circuits of each thereof in parallel with each other to said load circuit, and means for synchronizing said simultaneously rendering means of the respective couplings.

20. In a system for transferring power between a multiconductor electrical input system in which the voltage between the different conductors varies and an output circuit electrically coupled thereto, the coupling including electric valve means defining a plurality of discharge paths, said paths including a plurality of anodes connected to said conductors and cathode means connected to the load circuit and grid means for controlling the flow of current from said anodes to said cathode means, and means rendering said complete grid means positive with respect to said cathode means whereby current will flow to said cathode means from the one of said anodes which happens to be at the highest potential relative to said cathode means.

21. In a system for transferring power from a polyphase alternating current input circuit to an output circuit electrically coupled thereto, the coupling including electric valve means defining a plurality of discharge paths, said paths including a plurality of anodes electrically connected to different phases of said input circuit, and cathode means associated with said anodes for flow of current therebetween and grid means for controlling the flow of current from said anodes to said cathode means, means periodically biasing the potential of said complete grid means relative to that of said cathode means whereby current may flow to said cathode means from whichever one of said anodes is at the greatest positive potential relative to said cathode means as determined by the potentials impressed thereon by the input circuit.

22. In a system for transferring power from a polyphase alernating current input circuit to an output circuit electrically coupled thereto, the coupling including a group of electric valves, each of said valves having an anode and a cathode and a grid, circuit means connecting each of said anodes to a phase of said input circuit, circuit means connecting all of said cathodes together and to said output circuit, and means for jointly rendering the potential of each of said grids positive with respect to said cathodes.

23. In a system for transferring power from a polyphase alternating current input circuit to an output circuit electrically coupled thereto, the coupling including a group of electric valves, each of said valves having an anode and a cathode and a grid, circuit means connecting each of said anodes to a phase of said input circuit, circuit means connecting all of said cathodes together and to said output circuit, circuit means connecting all of said grids together whereby they may be jointly controlled, and means for jointly rendering the potential of each of said grids positive with respect to said cathodes.

24. In a system for transferring power from a polyphase alternating current input circuit to an alternating current output circuit electrically coupled thereto, the coupling comprising at least a pair of electric valve means, each of said valve means included in discharge paths from said input circuit to said output circuit, and means sequentially rendering all of said paths through one of said valve means in condition to transmit current and then all of said paths through the other of said valve means in condition to transmit current.

25. In a system for transferring power from a polyphase alternating current input circuit to an alternating current output circuit electrically coupled thereto, the coupling comprising at least a pair of electric valve means, each of said valve means included in discharge paths from said input circuit to said output circuit, means sequentially rendering all of said paths through one of said valve means in condition to transmit current and then all of said paths through the other of said valve means in condition to transmit current, and means terminating the flow of current through the one of said valve means upon initiation of current flow through the other of said valve means.

26. In a system for transferring power from a polyphase alternating current input circuit to an alternating current output circuit electrically coupled thereto, the coupling comprising at least a pair of electric valve means, one of said valve means included in discharge paths from certain of the phases of said input circuit to said output circuit, the other of said valve means included in discharge paths from certain other of the phases of said input circuit to said output circuit, and means sequentially rendering all of said paths through one of said valve means in condition to transmit current and then all of said paths through the other of said valve means in condition to transmit current.

27. In a system for transferring power from a polyphase alternating current input circuit to an alternating current output circuit electrically coupled thereto, the coupling comprising at least a pair of electric valve means, each of said valve means having cathode means and grid means and a plurality of anodes, circuit means connecting said anodes to phases of said input circuit, circuit means connecting the cathode means of one of said pair of electric valve means to said output circuit, circuit means connecting the cathode means of the other of said pair of electric valve means to said output circuit, means sequentially rendering each of the grid means positive with respect to its associated cathode means whereby any of said plurality of anodes associated with said valve means having its grid means positively biased with respect to its cathode means may conduct current to said output circuit, and means interconnecting said cathode means circuits to said output circuit whereby initiation of current flow through one of said valve means will terminate current flow through the other of said valve means.

28. The invention as described in claim 27 in which the load circuit comprises a transformer having a center tapped primary with one of its primary end terminals connected to the cathode means of one of said valve means and the other of its primary end terminals connected to the cathode means of the other of said valve means and in which the means interconnecting the cathode means circuits is a capacitor.

29. In an electric power transfer circuit for transferring power from a Y-connected supply circuit to a load circuit, a first electric valve means having an anode connected to a phase of said supply circuit remote from its common point with the other phases of said supply circuit and having a cathode, a second electric valve means having an anode connected to a phase of said supply circuit remote from said common point and a cathode, a tapped load circuit with two input connections and an output connection, circuit means connecting one of said input connection to said first valve means cathodes and the other of said input connection to said second valve means cathode, circuit means connecting said output connection to said common point, reactance means in said last-named circuit means, and a capacitor connected across said input connec- 30. In an electric power transfer circuit for transferring power from a Y-connected supply circuit to a load circuit, a first electric valve means having an anode connected to a phase of said supply circuit remote from its common point with the other phases of said supply circuit and having a cathode and a grid, a second electric valve means having an anode connected to a phase of said supply circuit remote from said common point and a cathode and a grid, a tapped load circuit with two input connections and an output connection, circuit means connecting one of said input connection to said first valve means cathodes and the other of said input connection to said second valve means cathode, circuit means connecting said output connection to said common point, reactance means in said last-named circuit means, a capacitor connected across said input connections, and means sequentially rendering said grids negative and positive with respect to their associated cathodes whereby said valve means are placed in condition to prevent and to permit initiation of current flow therethrough.

31. In a system for transferring alternating current energy between associated input and output circuits, a source constituting said input circuit and having a plurality of phases having separate terminals and a common terminal, a pair of electric valve means, each pair comprising a plurality of anodes and a common cathode connection, circuit means connecting each of said anodes of said pair of valve means to certain of said separate terminals, a translating means, means for sequentially rendering said valve means conductive, circuit means connecting said translating means to said common terminal, and means coupling said common cathode connections to said translating means so that successive current impulses passed by the respective valve means cause current flow in respectively opposite directions in the output circuit.

32. In a system for transferring alternating current energy between associated input and output circuits, a source constituting said input circuit and having a plurality of phases having separate terminals and a common terminal, a pair of electric valve means, each pair comprising a plurality of anodes and a common cathode connection, circuit means connecting each of said anodes of said pair of valve means to certain of said separate terminals, a translating means, means for sequentially rendering said valve means conductive having two opposite terminals and a common terminal, circuit means connecting one of said opposite terminals to one of said common cathode connections and the other of said opposite terminals to the other of said common cathode connections, and circuit means connecting said common terminals.

PAUL T. NIMS.

REFERENCES CITED

The following references are of record in the file of this patent:

UNITED STATES PATENTS

| Number | Name | Date |
| --- | --- | --- |
| 1,954,661 | Alexanderson et al. | Apr. 10, 1934 |
| 1,959,188 | Willis | May 15, 1934 |
| 2,213,945 | Alexanderson | Sept. 10, 1940 |

FOREIGN PATENTS

| Number | Country | Date |
| --- | --- | --- |
| 160,799 | Great Britain | Nov. 3, 1921 |

Certificate of Correction

Patent No. 2,447,133.

August 17, 1948.

PAUL T. NIMS

It is hereby certified that errors appear in the printed specification of the above numbered patent requiring correction as follows: Column 13, line 10, before the word "valve" insert *respective*; same line, strike out "rectifying"; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*